(12) United States Patent
Chen et al.

(10) Patent No.: US 8,719,500 B2
(45) Date of Patent: May 6, 2014

(54) TECHNIQUE FOR TRACKING SHARED DATA IN A MULTI-CORE PROCESSOR OR MULTI-PROCESSOR SYSTEM

(75) Inventors: Yen-Kuang Chen, Cupertino, CA (US); Christopher J. Hughes, Cupertino, CA (US); Changkyn Kim, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 12/592,998

(22) Filed: Dec. 7, 2009

(65) Prior Publication Data

US 2011/0138128 A1    Jun. 9, 2011

(51) Int. Cl.
*G06F 12/00* (2006.01)
(52) U.S. Cl.
USPC ............ 711/118; 711/128; 711/130; 711/144

(58) Field of Classification Search
USPC .................. 711/118, 128, 130, 144
See application file for complete search history.

(56) References Cited

U.S. PATENT DOCUMENTS

| 5,317,738 | A | * | 5/1994 | Cochcroft et al. | ............ 718/103 |
|---|---|---|---|---|---|
| 5,752,258 | A | * | 5/1998 | Guzovskiy et al. | ........... 711/120 |
| 5,974,438 | A | * | 10/1999 | Neufeld | ........................ 718/104 |
| 2005/0188159 | A1 | * | 8/2005 | Van Doren et al. | ........... 711/144 |
| 2007/0233964 | A1 | * | 10/2007 | Robinson | ...................... 711/136 |
| 2010/0250998 | A1 | * | 9/2010 | Herdrich et al. | ............... 713/501 |
| 2011/0078492 | A1 | * | 3/2011 | Kumar et al. | .................. 714/5.11 |
| 2011/0231593 | A1 | * | 9/2011 | Yasufuku et al. | .................. 711/3 |

* cited by examiner

*Primary Examiner* — Hong Kim
(74) *Attorney, Agent, or Firm* — Blakely, Sokoloff, Taylor & Zafman LLP

(57) ABSTRACT

A technique to track shared information in a multi-core processor or multi-processor system. In one embodiment, core identification information ("core IDs") are used to track shared information among multiple cores in a multi-core processor or multiple processors in a multi-processor system.

10 Claims, 8 Drawing Sheets

TECHNIQUE FOR TRACKING SHARED DATA IN A MULTI-CORE PROCESSOR OR MULTI-PROCESSOR SYSTEM

FIELD OF THE INVENTION

Embodiments of the invention relate generally to the field of information processing and more specifically, to the field of sharing data among processors within computer systems and microprocessors.

BACKGROUND

As the number of cores in a multi-core processor and/or number of processors in a multi-core system increases, so does the amount of data that must be shared among the processors or cores. Tracking the cores that have access to data within one or more caches becomes more complex as the number of cores or processors increases. Some prior art techniques have relied on increasingly large storage structures to track shared data among processors or cores. However, this may limit the number of cores or processors and the amount of data that can be shared among them due to die size and/or power constraints.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Figure 1:
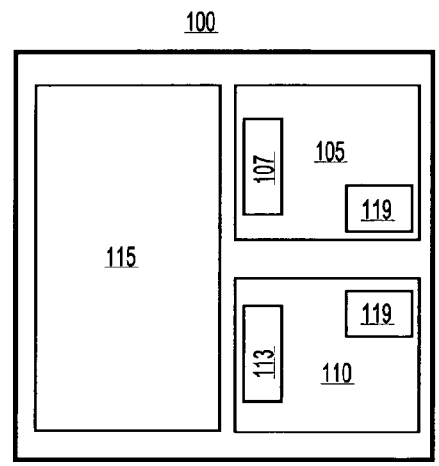
FIG. 1 illustrates a block diagram of a microprocessor, in which at least one embodiment of the invention may be used.

FIG. 1 illustrates a microprocessor in which at least one embodiment of the invention may be used. In particular, FIG. 1 illustrates microprocessor 100 having one or more processor cores 105 and 110, each having associated therewith a local cache 107 and 113, respectively. Also illustrated in FIG. 1 is a shared cache memory 115 which may store versions of at least some of the information stored in each of the local caches 107 and 113. In some embodiments, microprocessor 100 may also include other logic not shown in FIG. 1, such as an integrated memory controller, integrated graphics controller, as well as other logic to perform other functions within a computer system, such as I/O control. In one embodiment, each microprocessor in a multi-processor system or each processor core in a multi-core processor may include or otherwise be associated with logic 119 to enable tracking of shared data, in accordance with at least one embodiment. The logic may include circuits to enable hardware-specific activity indicators to be monitored, re-configurable activity indicators to be monitored, or a combination thereof. Alternatively, the logic 119 may be included in a cache memory of FIG. 1 or any other logic illustrated in FIG. 1.

In one embodiment, logic may be used within or outside of an integrated circuit to allow multiple cores or processors to share data by tracking which processor/core (referred to generically herein as "core") has access to a line of information stored in a cache. For example, instead of using increasingly large storage areas (e.g., "directories"), such as those in the prior art, embodiments of the invention use core identification information ("core IDs") to track the sharing of data among multiple cores. In one embodiment, a partially-mapped directory is used to take advantage of non-uniformity in the number of sharers for different cache lines.

Figure 2:
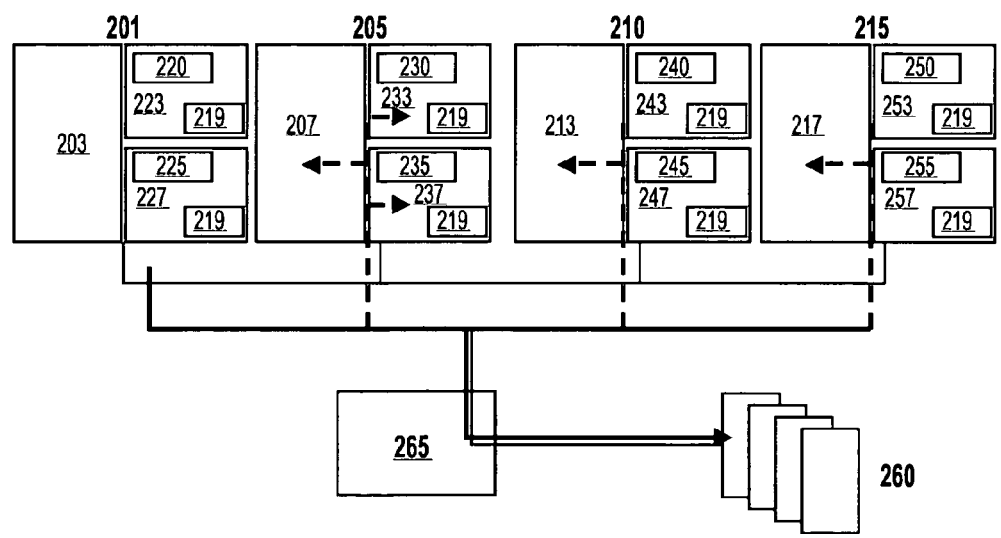
FIG. 2 illustrates a block diagram of a shared bus computer system, in which at least one embodiment of the invention may be used.

Embodiments of the invention may be used in numerous system architectures. FIG. 2, for example, illustrates a front-side-bus (FSB) computer system in which one embodiment of the invention may be used. Any processor 201, 205, 210, or 215 may access information from any local level one (L1) cache memory 220, 225, 230, 235, 240, 245, 250, 255 within or otherwise associated with one of the processor cores 223, 227, 233, 237, 243, 247, 253, 257. Furthermore, any processor 201, 205, 210, or 215 may access information from any one of the shared level two (L2) caches 203, 207, 213, 217 or from system memory 260 via chipset 265. One or more of the processors in FIG. 2 may include or otherwise be associated with logic 219 to store and track information indicating the cores that have access to data stored in one or more caches of system FIG. 2. Furthermore, logic 219 may be in one or more caches illustrated in FIG. 2 or any other logic block illustrated within FIG. 2.

Figure 3:
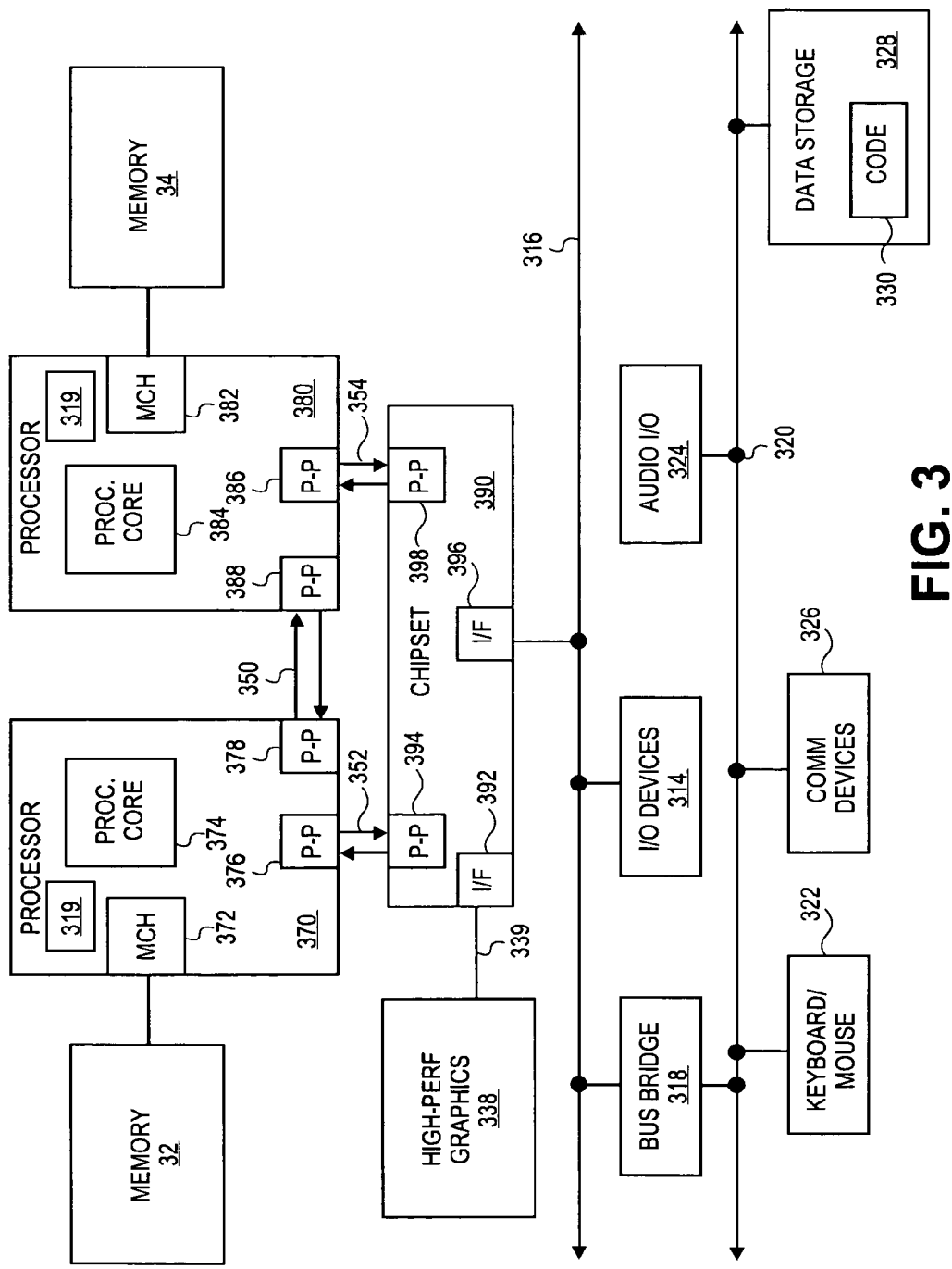
FIG. 3 illustrates a block diagram a point-to-point interconnect computer system, in which at least one embodiment of the invention may be used.

In addition to the FSB computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3. In one embodiment, any processor core may include or otherwise be associated with a local cache memory (not shown). Furthermore, a shared cache (not shown) may be included in either processor outside of both processors, yet connected with the processors via p2p interconnect. One or more of the processors or cores in FIG. 3 may include or otherwise be associated with logic 319 to track data to be shared among the various agents illustrated in FIG. 3. The logic may include or be associated with storage, such as one or more registers, cache memory, or DRAM, to store core IDs associated with any of the agents illustrated in the P2P system of FIG. 3.

Figure 4:
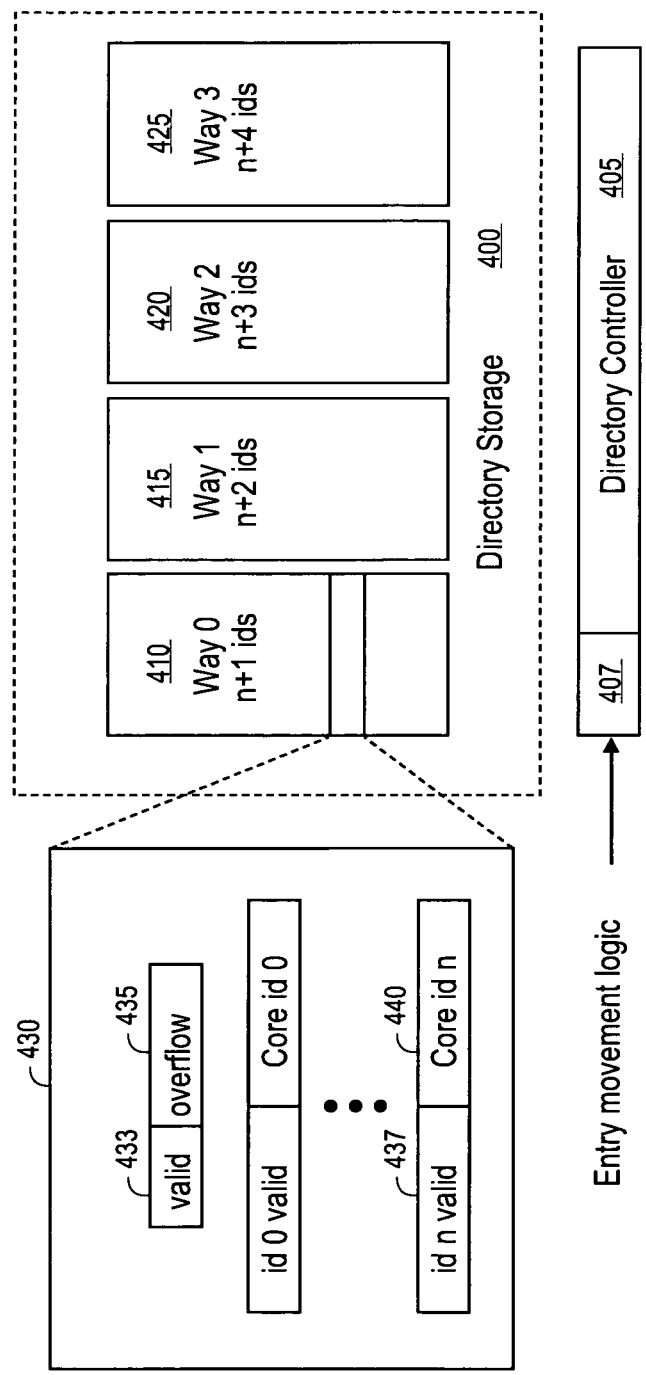
FIG. 4 is a block diagram illustrating logic that may be used in one embodiment of the invention.

FIG. 4 illustrates logic to perform at least one embodiment of the invention. In FIG. 4, directory 400 contains entries organized in a set associative manner, where the entries may store different numbers of core IDs and an overflow bit, in one embodiment. In one embodiment, entries in each of the directory ways 410, 415, 420, 425 have a different number of slots to hold core IDs (e.g., N+1, N+2, N+3, N+4 for each directory way 410, 415, 420, 425, respectively). In other embodiments, more or fewer cache ways can be used. In one embodiment, each directory entry 430 includes a valid field 433 to indicate an entry's validity, an overflow field 435 to indicate whether the number of core IDs that can be accommodated for a given way has been exceeded, and a core ID valid field 437 and corresponding core ID field 440 for each slot (e.g., core ID entry) in a given way.

The directory controller 405 has logic 407 to perform various functions, including detecting whether the number of agents sharing a line of data ("sharers") for an entry exceeds the number of slots available to the corresponding cache way, determining whether there is an available entry in a directory way of the same set with more slots, and moving an entry to the new available directory way (if available).

In one embodiment, the directory controller logic may also detect when the number of sharers falls below a certain threshold, such that a way with fewer slots could store an entry without indicating an overflow condition. In addition, the directory controller logic may determine whether a way with fewer slots available to store the entry is available in the same set as the entry and, if so, move the entry to the new way. In other embodiments, the directory controller logic may perform other functions, such as predicting which new way to choose when there are multiple empty entries that could be used to store an entry being moved or to store sharing information for a cache line that has no entry yet. In still other embodiments, the directory controller logic may swap entries in the same set rather than moving information to an empty entry. In other embodiments, the directory controller logic may perform other functions for controlling where to store core IDs.

Figure 5A:
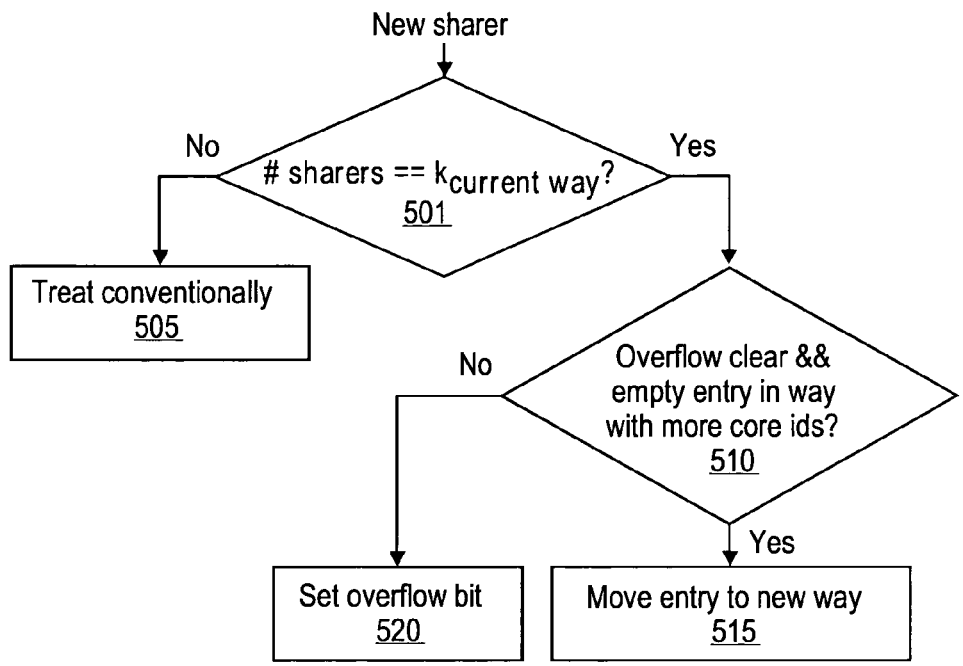
FIG. 5a is a flow diagram of some operations that may be used in conjunction with at least one embodiment.

FIG. 5a is a flow diagram illustrating at least some operations that may be performed according to one embodiment, such as an embodiment illustrated in FIG. 4. In one embodiment, if a new data sharer is present, it is determined whether the new sharer will cause the number of sharers to exceed the number of slots in the corresponding directory entry, at operation 501. If not, at operation 505, the addition of the new sharer is treated in a conventional manner. If so, then at operation 510, if the overflow field for the entry is clear and there is an empty entry in another way of the same set that has more slots, then at operation 515, the information in the full entry is moved to the empty entry in the way with more slots, and the new core ID is stored in the new entry. Otherwise, at operation 520, the overflow field is set to indicate an overflow condition. In other embodiments more or fewer operations may be performed.

Figure 5B:
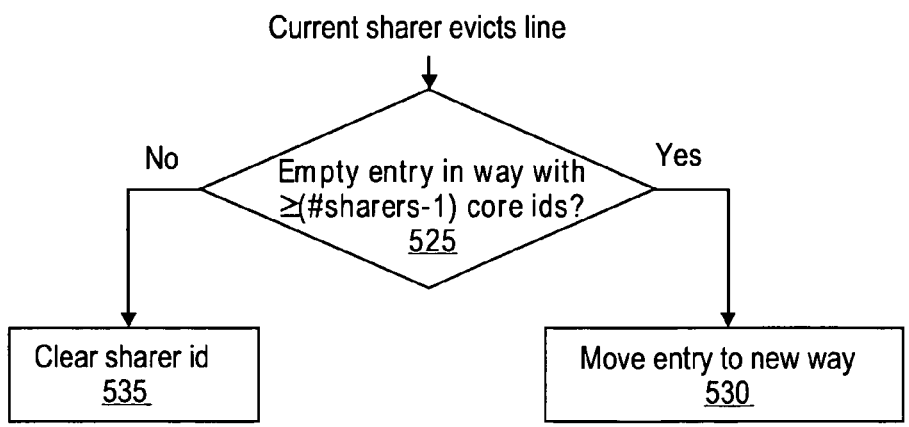
FIG. 5b is a flow diagram of some operations that may be used in conjunction with at least one embodiment.

FIG. 5b is a flow diagram illustrating at least some operations that may be performed according to one embodiment in the event a current data sharer causes a cache line eviction (i.e., the number of sharers reduces). At operation 525, it is determined whether there is an empty entry available in another way of the same set with fewer slots than the present one. If so, then at operation 530, the information in the full entry is stored in the empty entry with fewer slots. If not, then at operation 535, the sharer core ID is invalidated by clearing the valid bit in that sharer's slot in the directory entry.

Figure 6:
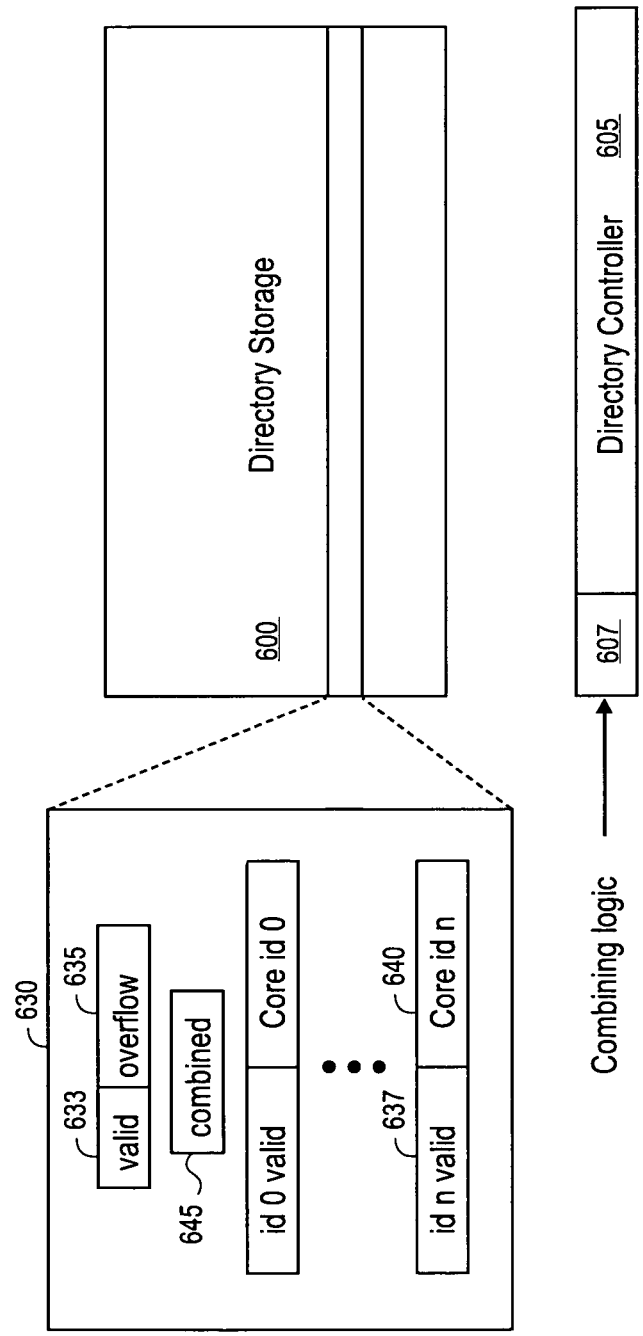
FIG. 6 is a block diagram illustrating logic that may be used in one embodiment of the invention.

FIG. 6 is a block diagram illustrating at least another embodiment, in which sharing information in directory entries may be combined. In FIG. 6, directory storage 600 contains entries organized in a set associative manner, where the entries may have different numbers of slots and an overflow bit, in one embodiment. In other embodiments, more or fewer cache ways can be used. In one embodiment, each directory entry 630 includes a valid field 633 to indicate an entry's validity, an overflow field 635 to indicate whether the number of slots has been exceeded, and a core ID valid field 637 and corresponding core ID field 640 for each slot in the entry. In one embodiment, each directory entry contains at least one additional "combined" bit field 645 to indicate if consecutive directory entries have their sharing information combined by indicating sharers of both lines. In one embodiment, the directory controller 605 has new logic 607 to detect whether the number of sharers for an entry exceeds the available number of slots for a single entry. If so, and the combined bit is not yet set, and the next entry in the directory (either in the same way or same set, depending on the particular embodiment) does not have its overflow bit set, the controller may combine the slots of the two entries, in one embodiment. In one embodiment, the directory controller contains logic to set the combined bits of the two combined entries and to delete any duplicate core IDs between the two entries, leaving one of the two copies of the same core ID valid. In one embodiment, the controller could also contain logic to only combine entries when the newly combined set of core IDs has enough empty slots to allow for additional sharers before the overflow bit must be set (i.e., there is enough overlap in the two sets of sharers, or one of the two entries has few sharers). The logic could also be extended to allow combining of more than two entries. And in other embodiments, non-consecutive entries may be combined.

Figure 7:
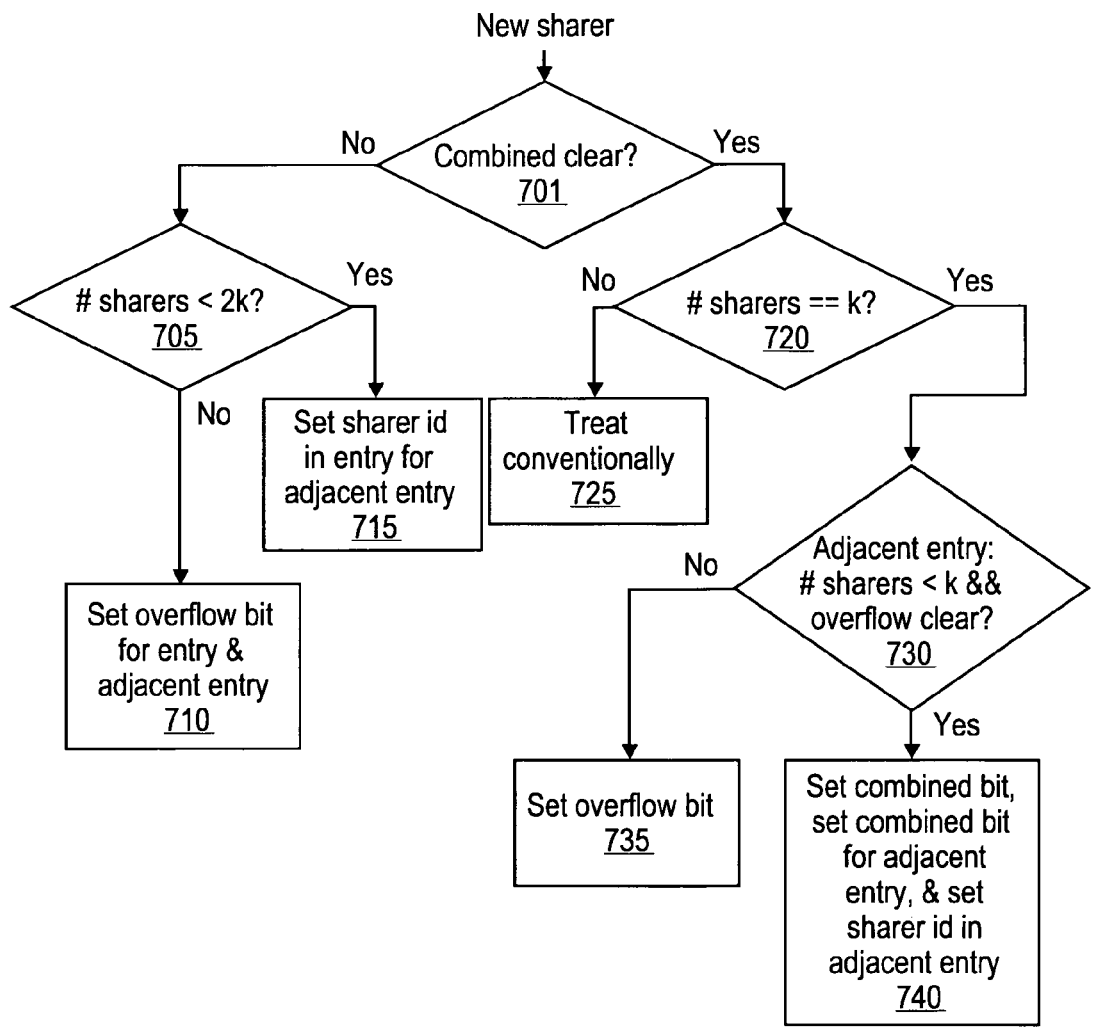
FIG. 7 is a flow diagram of some operations that may be used in conjunction with at least one embodiment.

FIG. 7 is a flow diagram illustrating operations that may be used in conjunction with at least one embodiment. In one embodiment, if a new sharer is detected, it is determined whether the combined field is clear at operation 701. If not, then it is determined whether the number of sharers is currently less than the sum of the number of slots in two entries (e.g., 2 k) at operation 705. If not, the overflow field is set for the entry and the adjacent entry at operation 710. If so, then the core ID of the new sharer is stored in a slot in the present entry or adjacent entry at operation 715. If it is determined at operation 701 that the combined field is cleared, then at operation 720 it is determined whether the new sharer will cause the number of sharers to exceed the number of slots in the entry (e.g., k). If not, then the new sharer is treated conventionally and the core ID is stored at operation 725. If so, then at operation 730, it is determined whether, for an adjacent entry, the number of sharers is less than the number of slots in that entry (e.g., k) and the overflow field is clear. If not, then at operation 735 the overflow field for the current entry is set. If so, then at operation 740, the combined field is set for the entry and adjacent entry and the core ID for the sharer is stored in a slot in the adjacent entry.

Figure 8:
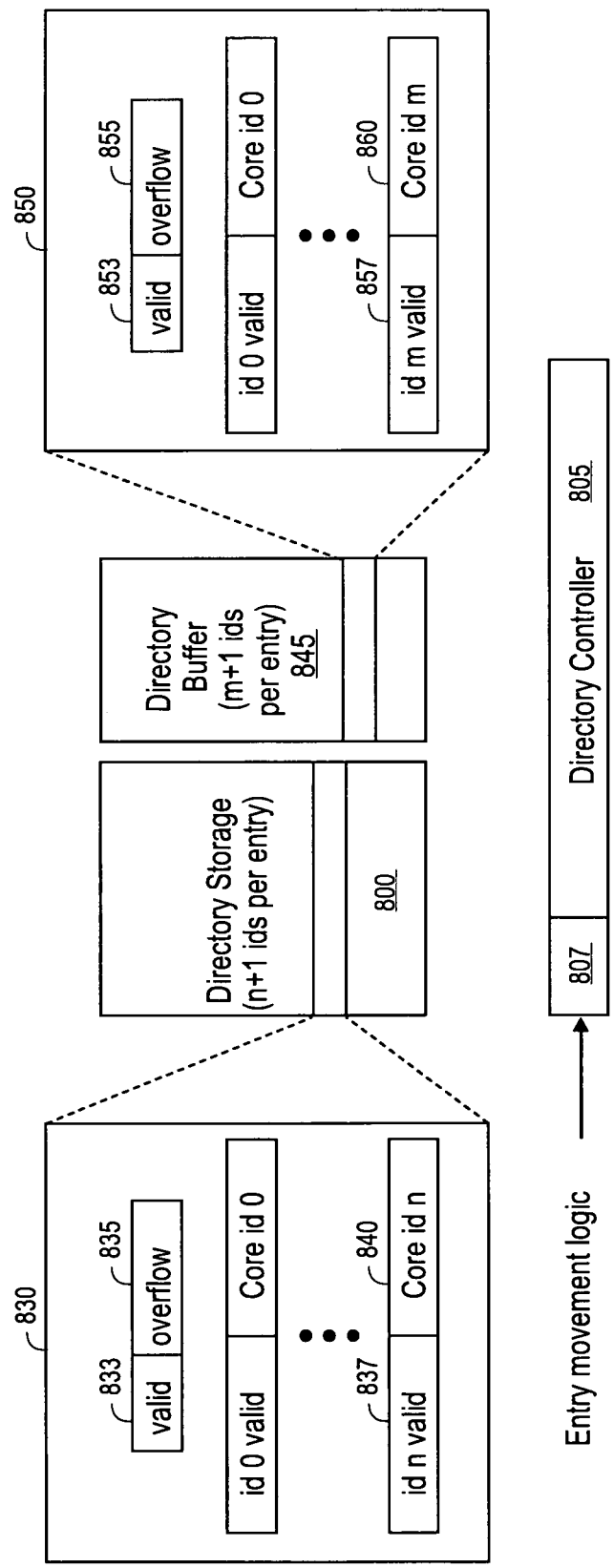
FIG. 8 is a block diagram illustrating logic that may be used in one embodiment of the invention.

FIG. 8 is a block diagram illustrating aspects of at least one other embodiment. In FIG. 8, directory storage 800 contains entries organized in a set associative manner, where the entries may have different numbers of slots and an overflow bit, in one embodiment. In other embodiments, more or fewer cache ways can be used. In one embodiment, each entry 830 includes a valid field 833 to indicate the entry's validity, an overflow field 835 to indicate whether the number of slots has been exceeded, and a core ID valid field 837 and corresponding core ID field 840 for each slot in an entry.

In one embodiment the directory contains a highly associative buffer 845 to hold directory entries with either more slots or a fully-mapped sharing vector (i.e., a bit vector with a dedicated bit for each possible sharer). In one embodiment, each entry 850 in the buffer includes a valid field 853 to indicate the entry's validity, an overflow field 855 to indicate whether the number of slots has been exceeded, and a core ID valid field 857 and corresponding core ID field 860 for each slot in an entry.

In one embodiment, the directory controller 805 has logic 807 to detect if the number of sharers for an entry in the normal directory structure will now exceed the number of slots for an entry, and, if so, move the entry to the buffer, either to an empty entry or replacing an existing entry and moving that one back to the normal directory structure and setting the overflow bit if necessary. Instead of replacing non-empty entries, in one embodiment, the directory may maintain a count of empty entries in the buffer and the directory controller may only move an entry to the buffer if the counter is non-zero.

In one embodiment, instead of moving an entry from the normal directory structure to the buffer, the directory may use the buffer to augment the slots of entries in the normal directory structure. That is, the directory may maintain, for some entries in the normal directory structure, a corresponding entry in the buffer. The sharer information for a piece of data may be spread across the corresponding pair of entries in the normal directory structure and the buffer. When the directory allocates an entry in the buffer to create more space for core IDs for a piece of data, it may place the new core ID in the buffer, or it may move some or all of the cores IDs from the normal directory structure to the buffer and place the new core ID in either the normal directory structure or the buffer.

Figure 9:
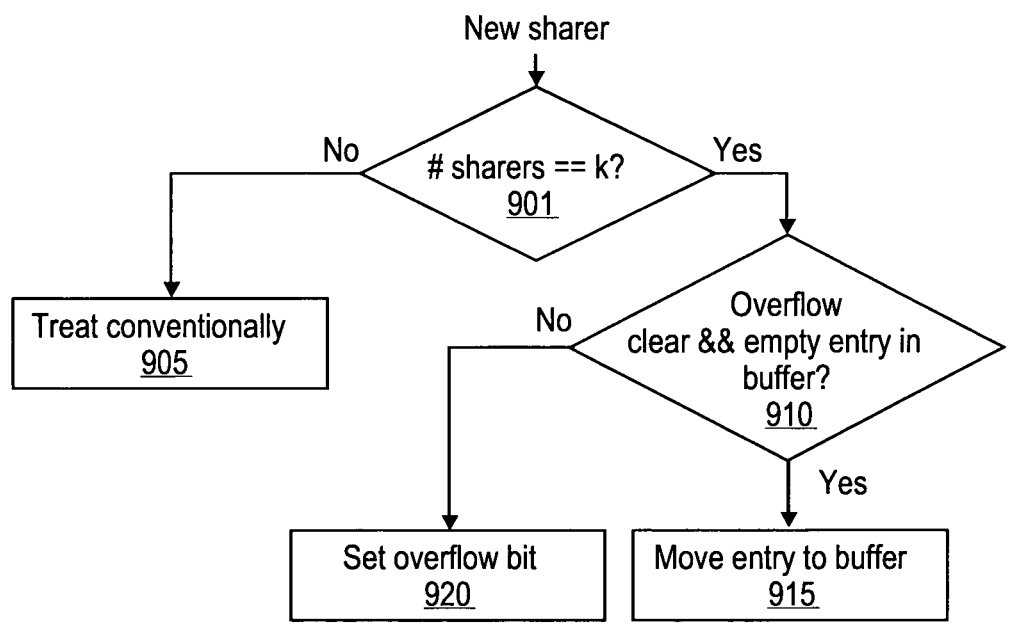
FIG. 9 is a flow diagram of some operations that may be used in conjunction with at least one embodiment.

FIG. 9 is a flow diagram illustrating operations that may be used in conjunction with at least one embodiment. In one embodiment, if a new data sharer is present, it is determined whether the new sharer will cause the number of sharers to exceed the number of slots in an entry, at operation 901. If not, at operation 905, the addition of the new sharer is treated in a conventional manner. If so, then at operation 910, if the overflow field for the way is clear and there is an empty entry in the buffer, then at operation 915, the information in the current entry is stored in the empty entry that has more slots, and the new core ID is also stored in the empty entry. Otherwise, at operation 920, the overflow field is set to indicate an overflow condition. In other embodiments more or fewer operations may be performed.

Embodiments of the invention make it more efficient to implement cache coherence for a large number of cores. Many use shared memory as the multiprocessor programming mode, although many researchers and product developers are researching the possibility of moving to a system without coherence, due in part to the cost of tracking sharers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for tracking data sharers in a multi-processor system or multi-core processor has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
a processor;
a directory controller to track a plurality of sharers of data stored in at least one cache, wherein the directory controller includes logic to maintain a first list of core identification fields (core IDs) corresponding to the plurality of sharers in a first directory entry, to create a second list of core IDs and store one or more core IDs of the second list in slots of a second directory entry in response to a new sharer, and to maintain a combined field to indicate whether slots corresponding to the first and the second directory entries are to be combined.

2. The system of claim 1, wherein the first directory entry is in a first set and the second directory entry is in a second set.

3. The system of claim 1, wherein the second directory entry is in a buffer.

4. A method comprising:
indicating a plurality of sharers of data stored in at least one cache, wherein the indicating is to maintain a first list of core identification fields (core IDs) corresponding to the plurality of sharers in a first directory entry, wherein a second list of core IDs is created and one or more core IDs of the second list are stored in slots of a second directory entry in response to a new sharer; and
determining whether the first directory entry is full, and if so, storing the second list in the combined slots in the first directory entry and storing the second directory entry.

5. The method of claim 4, further comprising determining whether the first directory entry is full, and if so, moving the second list of core IDs to the second directory entry.

6. The method of claim 5, wherein the first directory entry is in a first way and the second directory entry is in a second way.

7. The method of claim 5, wherein the second directory entry is in a buffer.

8. The method of claim 4, wherein the first directory entry is in a first set and the second directory entry is in a second set.

9. The method of claim 4, wherein the second directory entry is in a buffer.

10. The method of claim 4, further comprising maintaining a combined field to indicate whether slots corresponding to the first and the second directory entries are to be combined.

* * * * *